UNITED STATES PATENT OFFICE.

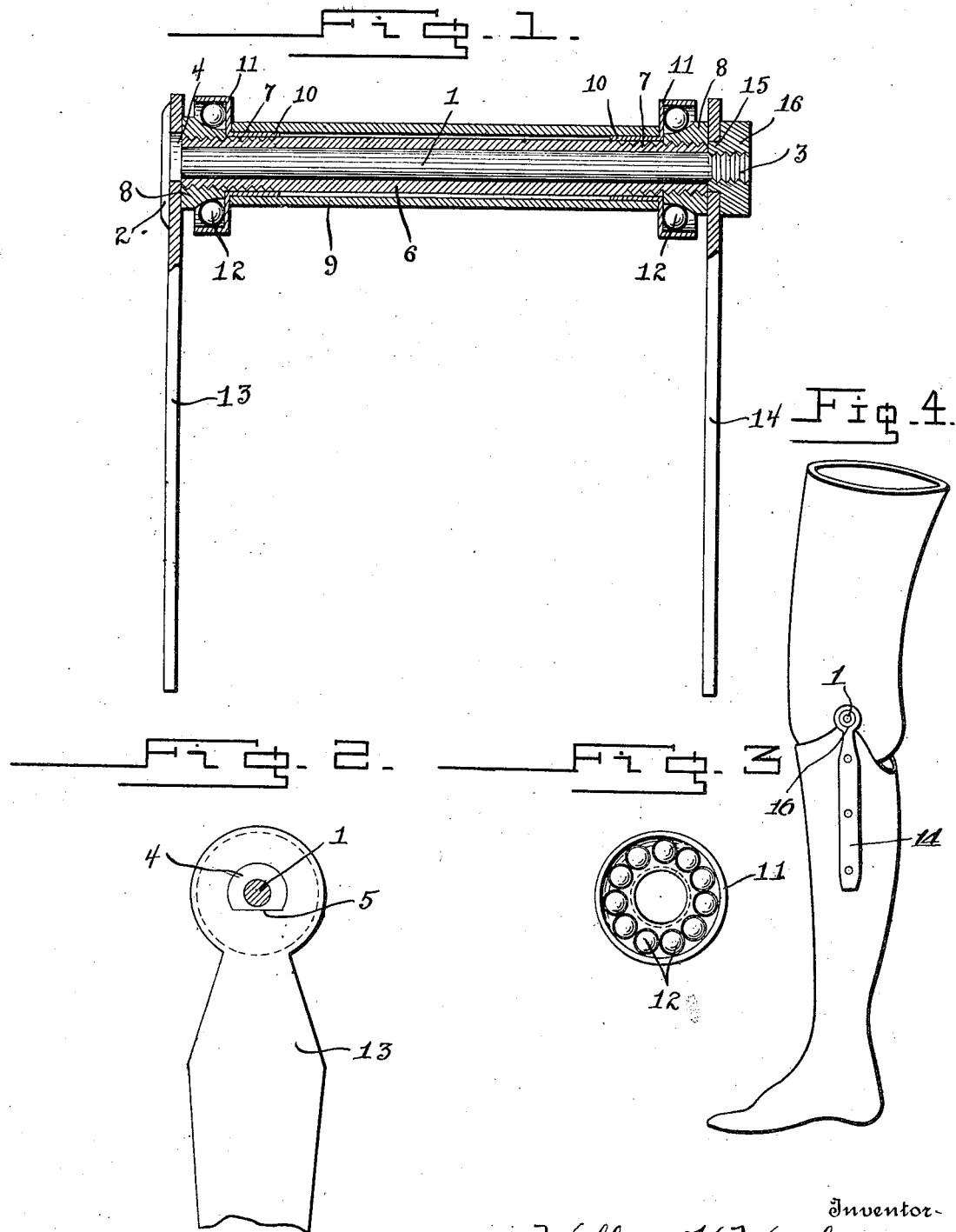

WILLIAM H. WAMBSGANS AND JACOB WAMBSGANS, OF PEORIA, ILLINOIS.

KNEE-JOINT FOR ARTIFICIAL LIMBS.

1,243,906. Specification of Letters Patent. Patented Oct. 23, 1917.

Application filed May 19, 1915. Serial No. 29,185.

*To all whom it may concern:*

Be it known that we, WILLIAM H. WAMBSGANS and JACOB WAMBSGANS, citizens of the United States, residing at Peoria, in the county of Peoria and State of Illinois, have invented certain new and useful Improvements in Knee-Joints for Artificial Limbs, of which the following is a specification.

This invention relates to artificial limbs and more particularly to knee joints, where a femoral amputation has taken place.

An object of the invention is to reduce friction to the minimum, thereby permitting free movement of the tibia, independently of the femur, and positively preventing stiffening of the joints, due to hardening of the lubricant, etc.

Other objects as well as the nature, characteristic features and scope of our invention will be more readily understood from the following description taken in connection with the accompanying drawings and pointed out in the claim forming a part of this specification.

Referring to the drawings:

Figure 1 is a longitudinal sectional view of a knee joint constructed in accordance with our invention, Fig. 2 is a detail enlarged sectional view, a part thereof being broken away, of one end of the joint, showing to advantage the manner in which the shaft is held from movement, and Fig. 3 is a detail enlarged elevational view of one of the bearing caps used in this invention.

Fig. 4 is a side elevation of an artificial limb constructed in accordance with the invention.

In the drawings, a main shaft 1 is provided which is preferably of a cylindrical configuration and is provided with a head 2 on one end thereof, the opposite end being provided with screw-threads 3. A portion of the shank of the bolt 1 in proximity to the head 2, is enlarged, as indicated at 4 and is provided with a flat side 5, as shown to advantage in Fig. 2. A bearing tube 6 is snugly engaged with the outer periphery of the shaft 1, and has the opposite ends of the outer periphery thereof screw-threaded, as indicated at 7, for threaded engagement with the threaded bores of bearing nuts 8, the latter being of a substantially conical configuration.

A sleeve 9 is arranged upon the bearing tube 6, and is of a diameter slightly larger than the diameter of the latter, being held in spaced relation thereto through the medium of glands 10, the latter being formed by extending the inner end of each of the bearing cups 11. The cups 11 are adapted to receive ball-bearings 12, the latter being held in said cups from displacement in view of the tapered configuration of the conical nuts 8, the outer periphery of each of the latter providing a race in which said ball-bearings 12 are mounted.

A metallic strap 13 is mounted upon one end of the shaft 1 and is provided with an opening therein conforming to the contour of the enlargement 4 on said bolt, for engagement therewith, said strap being arranged to normally abut the inner face of the head 2 of the shaft 1, and being held from displacement in this position by one of the conical nuts 8. A strap 14 is arranged in parallelism with the strap 13 and is provided with an opening therein which engages over a shank 15, the latter extending from the inner face of a jam nut 16, as illustrated to advantage in Fig. 1. The nut 16 is threaded upon the end 3 of the shaft 1 and is adapted to snugly engage the strap 14, with one of the nuts 8, whereby the ball-bearings 12 will be positively held from displacement, the inner end of the shank 15 of said nut abutting one end of the bearing tube 6, the opposite end of the latter abutting the enlarged portion 4 of the shaft 1, thereby positively retaining the tube 6 from movement independently of the shaft 1. The straps 13 and 14 are adapted for engagement with the artificial tibia in the usual manner, while the sleeve 9 is adapted to engage the artificial femur, thereby permitting movement of the artificial tibia and femur independently of each other.

It will be appreciated that the above construction will permit free movement of the upper and lower limbs, positively precluding stiffening of the joints which has heretofore been undesirable in the art, and has been caused by the gumming of the lubricant used to facilitate movement of the limbs independently of each other.

It will be understood that the above description and accompanying drawings comprehend only the general and preferred embodiment of our invention and that various minor changes in details of construction, proportion and arrangement of parts may be made within the scope of the appended claim without sacrificing any of the advantages of our invention.

Having thus fully described our invention, what we claim as new and desire to secure by Letters Patent is:

A joint of the character described comprising a sleeve, a second sleeve arranged in the first named sleeve and provided with exterior screw threads, annular ball retaining members mounted between the sleeves, bearing balls arranged therein, a shaft arranged in the second sleeve and having a head thereon, and also provided with an enlargement having one side thereof flat, frusto-conical members threaded on the ends of the second sleeve and bearing against the bearing balls, a connecting strap positioned on the enlargement between the head and one of the frusto-conical members and adapted to rotate with the shaft, a nut threaded on the opposite end of the shaft, a second connecting strap positioned between the nut and the frusto-conical member and held against movement by the same.

In testimony whereof we affix our signatures in presence of two witnesses.

WILLIAM H. WAMBSGANS.
JACOB WAMBSGANS.

Witnesses:
RAYMOND J. LEITNER,
WM. E. MORAN.